US012538016B2

(12) United States Patent
Mizuma

(10) Patent No.: US 12,538,016 B2
(45) Date of Patent: Jan. 27, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kenshiro Mizuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/352,545

(22) Filed: Jul. 14, 2023

(65) Prior Publication Data

US 2024/0031673 A1 Jan. 25, 2024

(30) Foreign Application Priority Data

Jul. 20, 2022 (JP) ................. 2022-115712

(51) Int. Cl.
*H04N 23/661* (2023.01)
*H04N 23/69* (2023.01)
*H04N 23/695* (2023.01)

(52) U.S. Cl.
CPC ........... *H04N 23/661* (2023.01); *H04N 23/69* (2023.01); *H04N 23/695* (2023.01)

(58) Field of Classification Search
CPC .... H04N 23/661; H04N 23/69; H04N 23/695; H04N 23/62; H04N 1/00389
See application file for complete search history.

(56) References Cited

U.S. PATENT DOCUMENTS

| 10,528,221 B2* | 1/2020 | Dugan | G06F 1/1626 |
| 2003/0140107 A1* | 7/2003 | Rezvani | H04L 67/02 |
| | | | 709/208 |
| 2006/0064732 A1* | 3/2006 | Hirosawa | H04N 23/66 |
| | | | 725/105 |
| 2014/0340323 A1* | 11/2014 | Jang | H04N 21/42224 |
| | | | 345/173 |
| 2019/0191086 A1* | 6/2019 | Kunishige | H04N 23/617 |

FOREIGN PATENT DOCUMENTS

JP 2021021904 A 2/2021

* cited by examiner

*Primary Examiner* — Christopher K Peterson
(74) *Attorney, Agent, or Firm* — Canon U.S.A., Inc. IP Division

(57) ABSTRACT

A display unit is caused to display each of a plurality of control items regarding control of an imaging apparatus using an input apparatus. The display unit is caused to display options for one or more operations belonging to a first group among a plurality of operations on the input apparatus as options for operations on the input apparatus that are assignable by a user operation to a control item of a first type among the plurality of control items. The display unit is caused to display options for one or more operations belonging to a second group different from the first group among the plurality of operations on the input apparatus as options for operations on the input apparatus that are assignable by a user operation to a control item of a second type different from the control item of the first type among the plurality of control items.

12 Claims, 14 Drawing Sheets

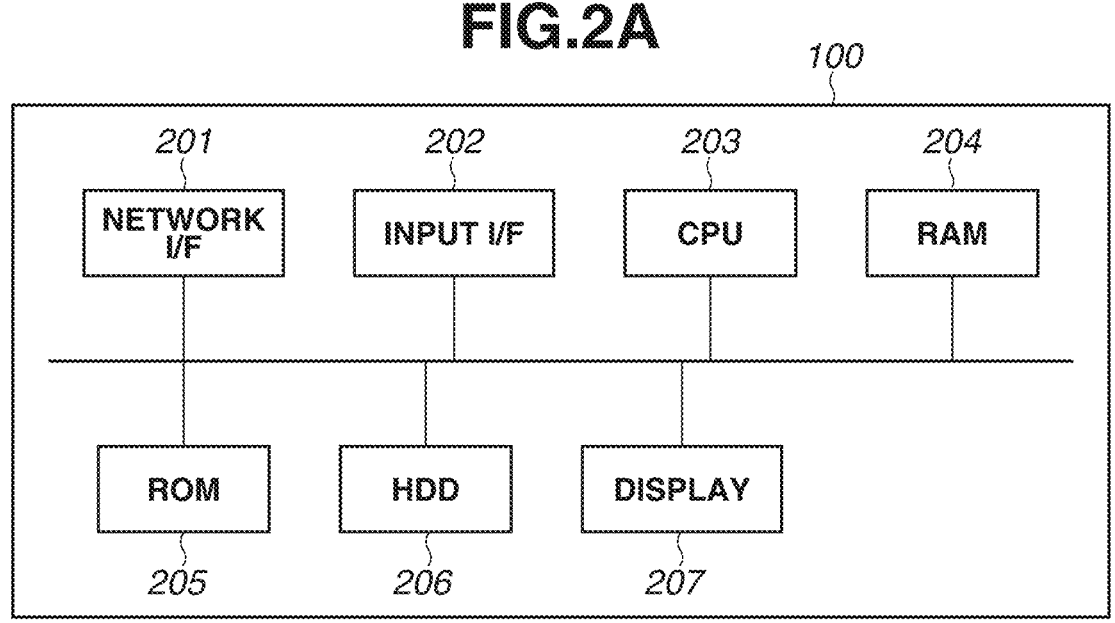
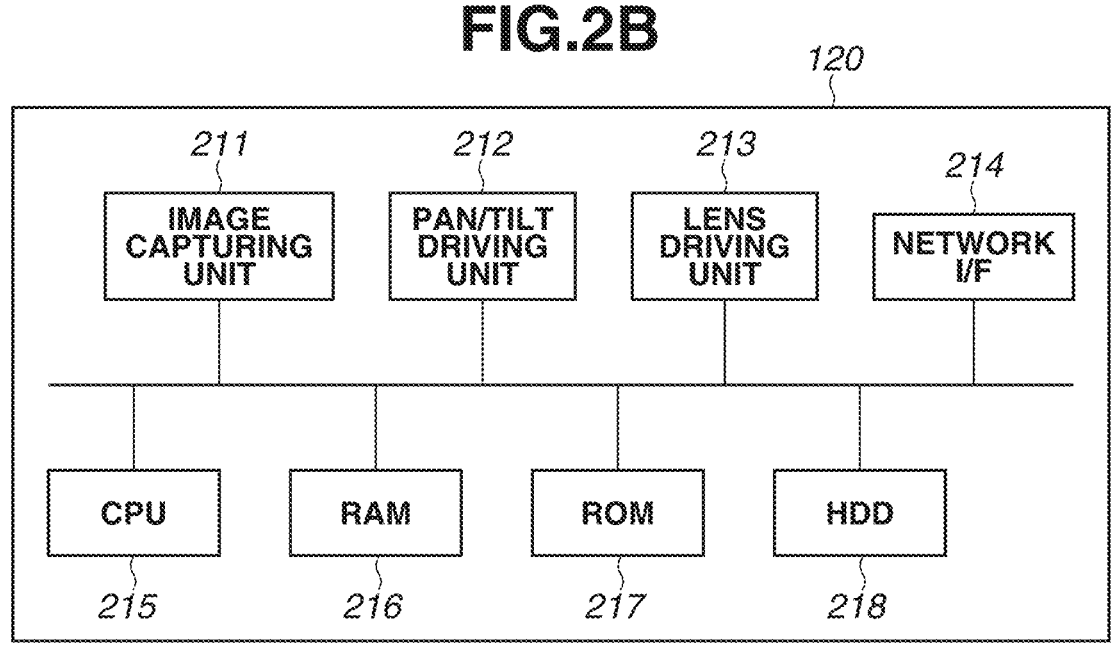

FIG.5A

| CONTROL ITEM | INPUT OPERATION |
|---|---|
| PAN | ▼ 503a |
| TILT | ▼ 503b |
| ZOOM | ▼ 503c |
| AF ON/OFF | ▼ 503d |
| PRESET 1 | ▼ 503e |
| PRESET 2 | ▼ 503f |

| CONTROL ITEM | INPUT OPERATION |
|---|---|
| PAN | STICK 1 X-AXIS ▼ |
| TILT | ✓ STICK 1 X-AXIS |
| ZOOM | STICK 1 Y-AXIS |
| | STICK 1 ROTATION |
| AF ON/OFF | STICK 2 X-AXIS |
| | STICK 2 Y-AXIS |
| PRESET 1 | STICK 2 ROTATION |
| PRESET 2 | ▼ |

| CONTROL ITEM (501) | INPUT OPERATION (502) | |
|---|---|---|
| PAN | | 503a |
| TILT | | 503b |
| ZOOM | | 503c |
| AF ON/OFF | | 503d |
| PRESET 1 | BUTTON 1 ▼ | 503e |
| | ✓ BUTTON 1 | |
| | BUTTON 2 | |
| | BUTTON 3 | |
| | BUTTON 4 | |
| PRESET 2 | ▼ | 503f |

| CONTROL ITEM (501) | INPUT OPERATION (502) | |
|---|---|---|
| PAN | STICK 1 X-AXIS ▼ | 503a |
| TILT | STICK 1 Y-AXIS ▼ | 503b |
| ZOOM | STICK 1 ROTATION ▼ | 503c |
| AF ON/OFF | BUTTON 4 ▼ | 503d |
| PRESET 1 | BUTTON 1 ▼ | 503e |
| PRESET 2 | BUTTON 2 ▼ | 503f |

FIG.11A 1100

MOTION TEST

STICK 1 X-AXIS: 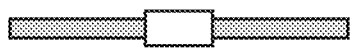  BUTTON 1: ①
STICK 1 Y-AXIS: 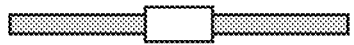  BUTTON 2: ②
STICK 1 ROTATION:   BUTTON 3: ③
STICK 2 X-AXIS: 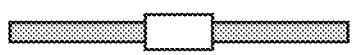  BUTTON 4: ④
STICK 2 Y-AXIS: 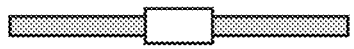
STICK 2 ROTATION: 

FIG.11B 1100

MOTION TEST 1101

STICK 1 X-AXIS: 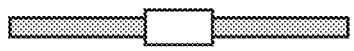  BUTTON 1: ①
STICK 1 Y-AXIS: 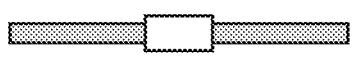  BUTTON 2: ②
STICK 1 ROTATION:   BUTTON 3: ③
STICK 2 X-AXIS:   BUTTON 4: ④
STICK 2 Y-AXIS: 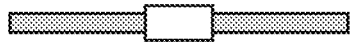
STICK 2 ROTATION: 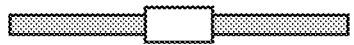

FIG.11C 1100

MOTION TEST                                            1102

STICK 1 X-AXIS: 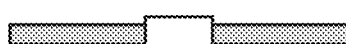  BUTTON 1: ①
STICK 1 Y-AXIS: 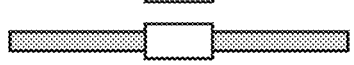  BUTTON 2: ②
STICK 1 ROTATION:   BUTTON 3: ③
STICK 2 X-AXIS: 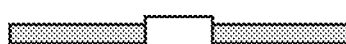  BUTTON 4: ④
STICK 2 Y-AXIS: 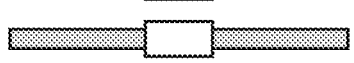
STICK 2 ROTATION: 

FIG.13

| CONTROL ITEM | INPUT OPERATION |
|---|---|
| PAN | STICK 1 X-AXIS ▼ |
| TILT | STICK 1 Y-AXIS ▼ |
| ZOOM | STICK 1 ROTATION ▼ |
| AF ON/OFF | BUTTON 4 ▼ |
| PRESET 1 | BUTTON 1 ▼ |
| PRESET 2 | BUTTON 2 ▼ |

~1301

1302

MOTION TEST

STICK 1 X-AXIS:
STICK 1 Y-AXIS:
STICK 1 ROTATION:
STICK 2 X-AXIS:
STICK 2 Y-AXIS:
STICK 2 ROTATION:

BUTTON 1: ●
BUTTON 2: ②
BUTTON 3: ③
BUTTON 4: ④

1303

OFF ● ON

INFORMATION PROCESSING APPARATUS, INFORMATION PROCESSING METHOD, AND STORAGE MEDIUM

BACKGROUND

Field of the Disclosure

The present disclosure relates to an information processing technique.

Description of the Related Art

Conventionally, the pan, tilt, and zoom (PTZ) of an imaging apparatus can be controlled using an input apparatus, such as a joystick and a gamepad. Japanese Patent Application Laid-Open No. 2021-21904 discusses a method for controlling the PTZ of an imaging apparatus using a joystick.

Regarding an input apparatus including a plurality of operation units, such as a plurality of buttons and sticks, there is a general user demand to assign a desired operation to a control item regarding control of an imaging apparatus serving as a control target, among a plurality of operations on the plurality of operation units. If all the plurality of operations on the input apparatus are set to options that are assignable to a certain control item for the imaging apparatus without taking into account the type of the certain control item, the user may erroneously assign an operation unsuitable for the certain control item.

SUMMARY

The present disclosure is directed to providing a technique capable of prompting the assignment of an appropriate operation to a control item.

According to an aspect of the present disclosure, an information processing apparatus includes one or more memories and one or more processors. The one or more processors and the one or more memories are configured to cause a display unit to display each of a plurality of control items regarding control of an imaging apparatus using an input apparatus, to display options for one or more operations belonging to a first group among a plurality of operations on the input apparatus as options for operations on the input apparatus that are assignable by a user operation to a control item of a first type among the plurality of control items, and to display options for one or more operations belonging to a second group different from the first group among the plurality of operations on the input apparatus as options for operations on the input apparatus that are assignable by a user operation to a control item of a second type different from the control item of the first type among the plurality of control items. The one or more processors and the one or more memories are configured to set assignment of operations on the input apparatus to the plurality of control items in accordance with one or more user operations.

Further features of various embodiments will become apparent from the following description of exemplary embodiments with reference to the attached drawings.

BRIEF DESCRIPTION OF THE DRAWINGS

FIGS. 2A and 2B are diagrams illustrating hardware configurations of an information processing apparatus and an imaging apparatus.

FIGS. 5A to 5D are diagrams illustrating setting of assignment of an operation to a control item.

FIGS. 11A to 11C are diagrams illustrating a window for a motion test.

FIG. 13 is a diagram illustrating display control of a window for assigning an operation to a control item.

DESCRIPTION OF THE EMBODIMENTS

With reference to the accompanying drawings, exemplary embodiments according to the present disclosure will be described below. The configurations illustrated in the following exemplary embodiments are merely examples, and are not limited to the configurations illustrated in the figures.

Figure 1:
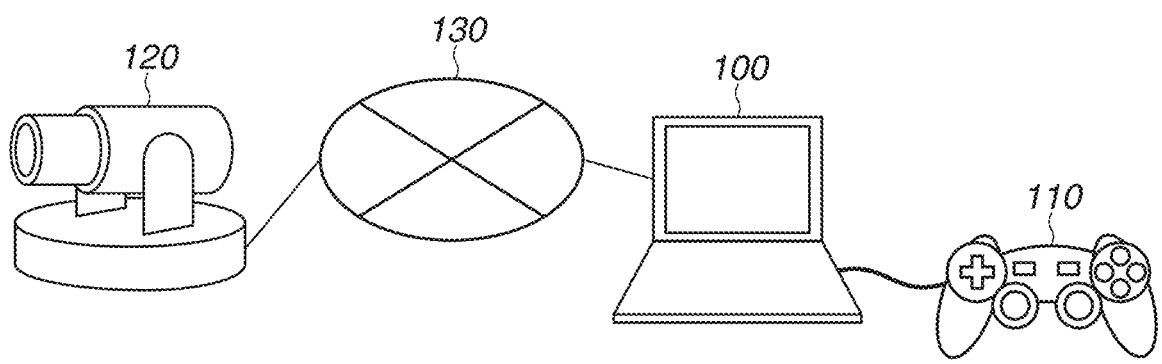
FIG. 1 is a diagram illustrating a configuration of a system.

A first exemplary embodiment of the present disclosure will be described below. FIG. 1 is a diagram illustrating the configuration of a system according to the present exemplary embodiment. The system according to the present exemplary embodiment includes an information processing apparatus 100, an input apparatus 110, an imaging apparatus 120, and a network 130. The information processing apparatus 100 and the imaging apparatus 120 are connected to each other via the network 130. The network 130 is realized by a plurality of routers, switches, and cables compliant with a communication standard, such as Ethernet. The network 130 may be realized by the Internet, a wired local area network (LAN), a wireless LAN, or a wide area network (WAN).

The information processing apparatus 100 is a personal computer including a processor, such as a central processing unit (CPU). The input apparatus 110 is an apparatus capable of controlling the information processing apparatus 100 and the imaging apparatus 120 and is an apparatus, such as a joystick or a gamepad. The input apparatus 110 is connected to the information processing apparatus 100 through a wired connection using Universal Serial Bus (USB). The input apparatus 110 may be connected to the information processing apparatus 100 through not only a wired connection but also a wireless connection. The input apparatus 110 may also be connected to the information processing apparatus 100 and the imaging apparatus 120 via the network 130 so that the input apparatus 110 can communicate with the information processing apparatus 100 and the imaging apparatus 120. The imaging apparatus 120 can capture an image and distribute the image to the information processing apparatus 100.

With reference to FIG. 2A, the hardware configuration of the information processing apparatus 100 will now be described. FIG. 2A is a diagram illustrating an example of the hardware configuration of the information processing apparatus 100. A network interface (I/F) 201 communicates with an external apparatus according to the Transmission Control Protocol/Internet Protocol (TCP/IP) or the Hypertext Transfer Protocol (HTTP) via the network 130. An input I/F 202 receives a command from the input apparatus 110 via USB. A CPU 203 is a central processing unit that performs overall control of the information processing apparatus 100. A random-access memory (RAM) 204 temporarily stores a computer program executed by the CPU 203. The RAM 204 provides a work area used to execute processing by the CPU 203. For example, the RAM 204 can function as a frame memory and function as a buffer memory. A read-only memory (ROM) 205 stores a program for the CPU 203 to control the information processing apparatus 100. A hard disk drive (HDD) 206 is a storage device that records image data. A display 207 includes a liquid crystal display (LCD) and displays an image transmitted from the imaging apparatus 120 and a user interface (UI) window. Although an example is described where the information processing apparatus 100 includes the display 207 in the present exemplary embodiment, some embodiments are not limited to this. The information processing apparatus 100 and the display 207 may have separate housings. In this case, the information processing apparatus 100 and the display 207 are connected together via a High-Definition Multimedia Interface (registered trademark) (HDMI), serial digital interface (SDI) cable, or the like.

Next, the hardware configuration of the imaging apparatus 120 is described with reference to FIG. 2B.

FIG. 2B is a diagram illustrating an example of the hardware configuration of the imaging apparatus 120. An image capturing unit 211 captures an image. Specifically, the image capturing unit 211 includes an image sensor, such as a charge-coupled device (CCD) sensor, a complementary metal-oxide-semiconductor (CMOS) sensor, and the like. The image capturing unit 211 photoelectrically converts an object image formed through lenses of the imaging apparatus 120, thus generating an electric signal. The image capturing unit 211 performs the process of converting the electric signal obtained through the photoelectric conversion into a predetermined digital signal, thus generating an image. A pan/tilt driving unit 212 includes a mechanical driving system capable of performing the pan motion and the tilt motion of the imaging apparatus 120, and a motor as a driving source. A lens driving unit 213 includes a driving system for a focus lens and a zoom lens and can control the zoom and the focus of the imaging apparatus 120. A network I/F 214 communicates with an external apparatus in accordance with the TCP/IP or the HTTP via the network 130.

A CPU 215 performs overall control of the imaging apparatus 120. A RAM 216 temporarily stores a computer program executed by the CPU 215. The RAM 216 provides a work area used to execute processing by the CPU 215. For example, the RAM 216 can function as a frame memory and function as a buffer memory. A ROM 217 stores a program for the CPU 215 to control the imaging apparatus 120. An HDD 218 is a storage device that records image data.

Figure 3:
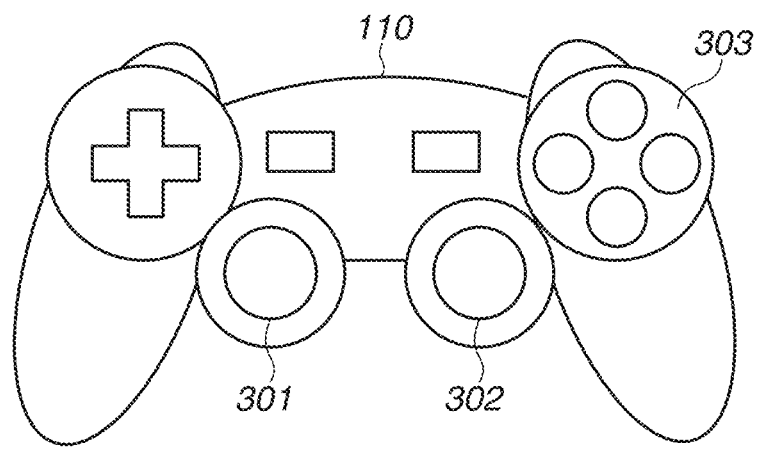
FIG. 3 is an external view of an input apparatus.

Next, the input apparatus 110 according to the present exemplary embodiment is described with reference to FIG. 3. FIG. 3 is a diagram illustrating an example of the external appearance of the input apparatus 110 according to the present exemplary embodiment. The input apparatus 110 includes a first stick unit 301, a second stick unit 302, and a button unit 303 including a plurality of buttons. The first stick unit 301 is a stick-shaped operation unit that can be inclined in a predetermined direction from a neutral position (a center position). A user can operate the first stick unit 301 by inclining the first stick unit 301 from the neutral position (the center position). It is possible to acquire two types of values, namely the amount of inclination in a left-right direction (an X-axis direction) and the amount of inclination in an up-down direction (a Y-axis direction), as a value indicating a control value of the stick unit 301. It is also possible to rotate a stick of the first stick unit 301 clockwise (or counterclockwise) about the stick at the neutral position (the center position) and obtain the amount of the rotation as a control value. The second stick unit 302 is a stick-shaped operation unit that can be inclined in a predetermined direction from a neutral position (a center position), like the first stick unit 301. The user can operate the second stick unit 302 by inclining the second stick unit 302 from the neutral position (the center position). It is possible to acquire two types of values, namely the amount of inclination in the left-right direction (the X-axis direction) and the amount of inclination in the up-down direction (the Y-axis direction), as a control value of the stick unit 302. It is also possible to rotate a stick of the second stick unit 302 clockwise (or counterclockwise) about the stick at the neutral position (the center position) and obtain the amount of the rotation as a control value. The button unit 303 is constituted by a plurality of buttons including a first button, a second button, a third button, and a fourth button. A value indicating the operation amount of each button is a binary value, namely a value indicating the state where the button is pressed or a value indicating the state where the button is not pressed. While the input apparatus 110 includes a plurality of sticks (the first stick unit 301 and the second stick unit 302) in the example illustrated in FIG. 3, the input apparatus 110 may include only a single stick.

Figure 4:
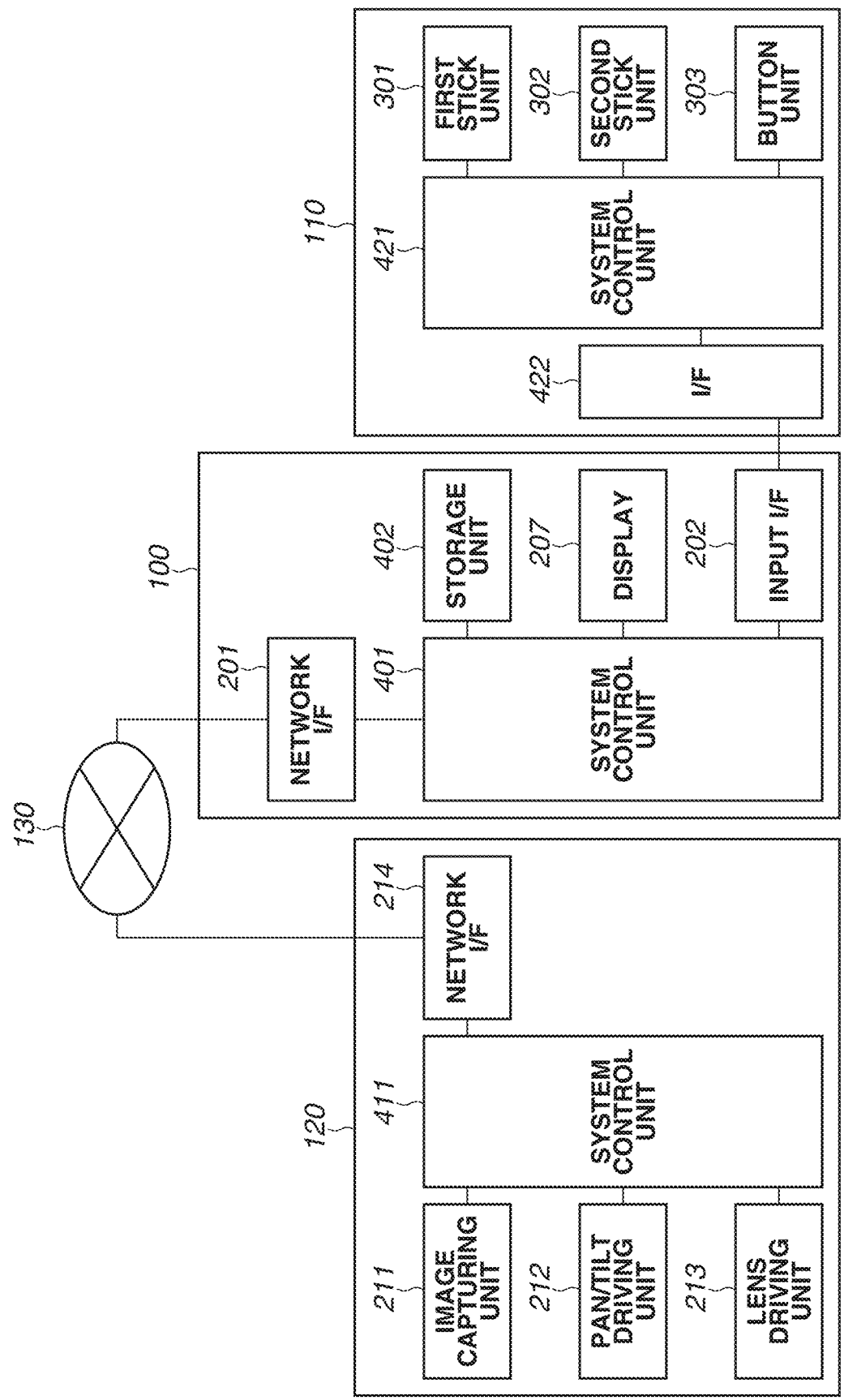
FIG. 4 is a diagram illustrating functional blocks of the apparatuses.

Next, the functions of the information processing apparatus 100, the input apparatus 110, and the imaging apparatus 120 are described with reference to functional blocks illustrated in FIG. 4. The functions of the information processing apparatus 100 are initially described. The functions of a system control unit 401 and a storage unit 402 of the information processing apparatus 100 illustrated in FIG. 4 are implemented by, for example, the CPU 203 of the information processing apparatus 100 executing computer-executable instructions stored in the ROM 205 of the information processing apparatus 100.

The system control unit 401 of the information processing apparatus 100 controls the entirety of the information processing apparatus 100. In accordance with an operation on the input apparatus 110, the system control unit 401 also generates a command to control the pan, tilt, and zoom or the autofocus of the imaging apparatus 120 (a control command) and transmits the command to the imaging apparatus 120 via the network I/F 201. The system control unit 401 also acquires an image transmitted from the imaging apparatus 120 via the network I/F 201 and displays the image on the display 207. The storage unit 402 stores information regarding the setting of the assignment of an operation to a control item (described above).

The input apparatus 110 includes a system control unit 421 that controls the input apparatus 110.

The system control unit 421 transmits a control value in accordance with an operation on the first stick unit 301, the second stick unit 302, or the button unit 303 to the information processing apparatus 100 via an I/F 422.

A system control unit 411 of the imaging apparatus 120 is implemented by, for example, the CPU 215 of the imaging apparatus 120 executing computer-executable instructions stored in the ROM 217 of the imaging apparatus 120, and the system control unit 411 controls the entire imaging apparatus 120. The system control unit 411 analyzes a control command received from the information processing apparatus 100 and performs processing in accordance with the control command. For example, if the system control unit 411 receives a control command to adjust image quality, the system control unit 411 controls the image capturing unit 211 to adjust image quality. If the system control unit 411 receives a control command to control the pan and tilt, the system control unit 411 controls the pan/tilt driving unit 212 to control the pan and tilt of the imaging apparatus 120. If the system control unit 411 receives a control command to control the zoom or a control command to control the focus, the system control unit 411 controls the lens driving unit 213 to control the zoom or the focus of the imaging apparatus 120. If the system control unit 411 receives an image acquisition command, the system control unit 411 acquires image data generated by the image capturing unit 211 and transmits the image data to the information processing apparatus 100 via the network I/F 214.

A description will now be provided of the setting of the assignment of an operation to a control item according to the present exemplary embodiment with reference to FIGS. 5A to 5D. A window 500 illustrated in FIG. 5A is a graphical user interface (GUI) displayed on the display 207 by the control unit 401 of the information processing apparatus 100. The window 500 displays a control item 501 and an input operation 502. The control item 501 indicates the details of control of the imaging apparatus 120, and there are control items "pan", "tilt", "zoom", "AF on/off", "preset 1", and "preset 2". The control item "pan" corresponds to control of the pan motion of the imaging apparatus 120 (control of the speed of changing the pan and control of the direction of changing the pan). The control item "tilt" corresponds to control of the tilt motion of the imaging apparatus 120 (control of the speed of changing the tilt and control of the direction of changing the tilt). The control item "AF on/off" corresponds to control of whether to turn on or off the autofocus function of the imaging apparatus 120. The control item "preset 1" corresponds to control for changing values of the pan, tilt, and zoom of the imaging apparatus 120 so that the imaging apparatus 120 is set at a first preset position (values of pan, tilt, and zoom positions) of the imaging apparatus 120 registered in advance. The control item "preset 2" corresponds to control for changing the values of the pan, tilt, and zoom of the imaging apparatus 120 so that the imaging apparatus 120 is set at a second preset position (values of pan, tilt, and zoom positions) of the imaging apparatus 120 registered in advance. The first and second preset positions are independent of each other, and it is possible to register the values of different pan, tilt, and zoom. In the examples illustrated in FIGS. 5A to 5D, there is the control item "AF on/off" as a control item for switching the on and off states of a predetermined function of the imaging apparatus 120. Some embodiments, however, are not limited to this, and there may be other control items. For example, there may be a control item for switching the on and off states of an automatic exposure control function.

Figure 6A:
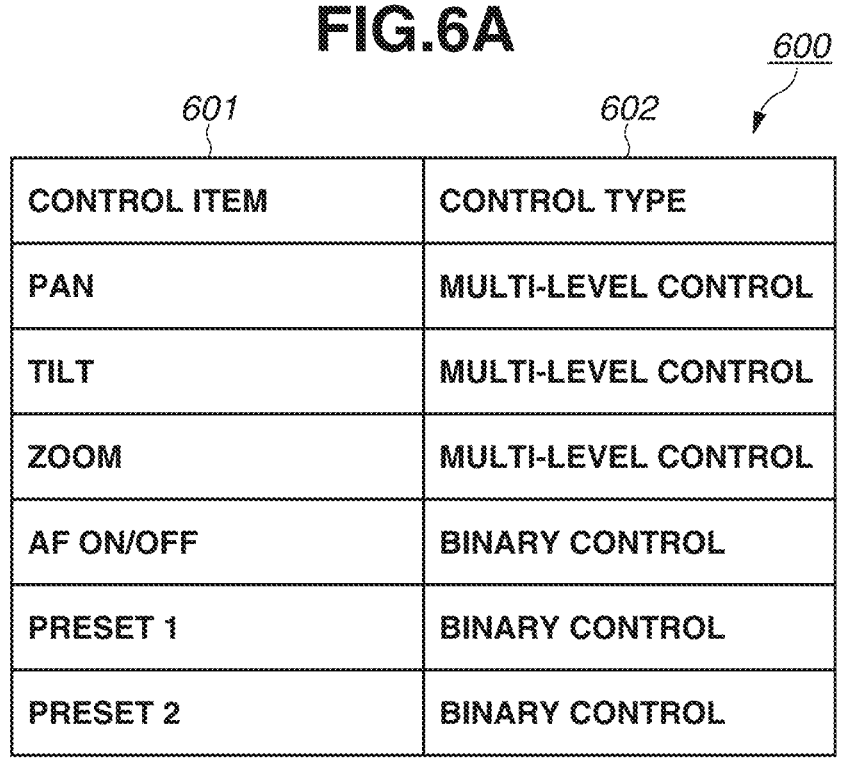
FIGS. 6A and 6B are diagrams illustrating various types of information stored in a storage unit.

In the present exemplary embodiment, the control of the imaging apparatus 120 is divided into two types, namely control of a first type and control of a second type. The control of the first type is multi-level control that is control at three or more levels (control at multiple levels). The control of the second type is binary control that is control at two levels. FIG. 6A illustrates a correspondence table 600 including a control item 601 of the imaging apparatus 120 and a control type 602, which is the type of control. For example, the control item "pan" corresponds to control of the pan motion, such as control of the direction of changing the pan of the imaging apparatus 120 and control of the speed of changing the pan. In particular, control at multiple levels is to be performed in the control of the speed of changing the pan, and thus, the control item "pan" is the multi-level control. The control item "tilt" corresponds to control of the tilt motion, such as control of the direction of changing the tilt of the imaging apparatus 120 and control of the speed of changing the tilt. In particular, control at multiple levels is to be performed in the control of the speed of changing the tilt, and thus, the control item "tilt" is the multi-level control. The control item "zoom" corresponds to control of the zoom motion such as control of the zooming in and out of the imaging apparatus 120 and control of the speed of changing the zoom. In particular, control at multiple levels is to be performed in the control of the speed of changing the zoom, and thus, the control item "zoom" is the multi-level control. In contrast, the control item "AF on/off" corresponds to control of the on and off states of the autofocus function of the imaging apparatus 120, which is control based on a binary value indicating on or off. Thus, the control item "AF on/off" is the binary control. Similarly, the control item "preset 1" corresponds to control based on a binary value indicating whether to move the values of the pan, tilt, and zoom of the imaging apparatus 120 to the first preset position (values of pan, tilt, and zoom positions). Thus, the control item "preset 1" is the binary control. Similarly, the control item "preset 2" corresponds to control based on a binary value indicating whether to move the values of the pan, tilt, and zoom of the imaging apparatus 120 to the second preset position (values of the pan, tilt, and zoom positions). Thus, the control item "preset 2" is the binary control. The correspondence table 600 illustrated in FIG. 6A is stored in the storage unit 402.

Returning to FIG. 5A, GUI buttons 503a to 503f are displayed in the field of the input operation 502 on the window 500. The GUI button 503a is a GUI associated with the control item "pan". The GUI button 503b is a GUI associated with the control item "tilt". The GUI button 503c is a GUI associated with the control item "zoom". The GUI button 503d is a GUI associated with the control item "AF on/off". The GUI button 503e is a GUI associated with the control item "preset 1". The GUI button 503f is a GUI associated with the control item "preset 2". A case is assumed where any of the GUI buttons 503a to 503f is pressed by the user. At this time, in accordance with the type of the control item associated with the pressed GUI button, the control unit 401 identifies options for operations that are assignable to the control item, and displays the identified options for the one or more operations on the window 500.

A case is assumed where a click operation is performed by the user on the GUI button 503a associated with the control item "pan" illustrated in FIG. 5A. In this case, as illustrated in FIG. 5B, the control unit 401 displays options for input operations on the input apparatus 110 that are assignable to the control item "pan" on the display 207. At this time, the control unit 401 determines whether the control of the control item "pan" is the binary control or the multi-level control. In the present exemplary embodiment, the control unit 401 references the correspondence table 600 stored in the storage unit 402 and determines whether the control of the control item "pan" is the binary control or the multi-level control. In the present exemplary embodiment, the control unit 401 determines that the control of the control item "pan" is the multi-level control. As illustrated in FIG. 5B, the control unit 401 displays not one or more operations corresponding to the binary control but options 504 for one or more operations corresponding to the multi-level control as the options for the input operations that are assignable to the control item "pan" on the display 207. In other words, the control unit 401 displays options for one or more operations belonging to a first group among a plurality of operations on the input apparatus 110 as options for input operations that are assignable to a control item of the first type (a control item at multiple levels) on the display 207. "The one or more operations belonging to the first group" indicate the one or more operations corresponding to the multi-level control. In the present exemplary embodiment, the one or more operations corresponding to the multi-level control include an operation "stick 1 X-axis", an operation "stick 1 Y-axis", an operation "stick 1 rotation", an operation "stick 2 X-axis", an operation "stick 2 Y-axis", and an operation "stick 2 rotation".

The operation "stick 1 X-axis" is an operation of inclining the stick of the first stick unit 301 in the horizontal direction (the X-axis direction), which is an input operation at multiple levels in accordance with the degree of inclination (the amount of inclination) of the stick, and thus corresponds to the multi-level control. The operation "stick 1 Y-axis" is an operation of inclining the stick of the first stick unit 301 in the vertical direction (the Y-axis direction), which is an input operation at multiple levels in accordance with the degree of inclination (the amount of inclination) of the stick, and thus corresponds to the multi-level control. The operation "stick 1 rotation" is an operation of rotating the stick of the first stick unit 301 clockwise (or counterclockwise) about the stick, which is an input operation at multiple levels in accordance with the degree of the rotation (the amount of the rotation), and thus corresponds to the multi-level control. The operation "stick 2 X-axis" is an operation of inclining the stick of the second stick unit 302 in the horizontal direction (the X-axis direction), which is an input operation at multiple levels in accordance with the degree of inclination (the amount of inclination) of the stick, and thus corresponds to the multi-level control. The operation "stick 2 Y-axis" is an operation of inclining the stick of the second stick unit 302 in the vertical direction (the Y-axis direction), which is an input operation at multiple levels in accordance with the degree of inclination (the amount of inclination) of the stick, and thus corresponds to the multi-level control. The operation "stick 2 rotation" is an operation of rotating the stick of the second stick unit 302 clockwise (or counterclockwise) about the stick, which is an input operation at multiple levels in accordance with the degree of the rotation (the amount of the rotation), and thus corresponds to the multi-level control.

As described above, if the GUI button 503*a* associated with the control item "pan" is pressed, the control unit 401 determines that the control item "pan" is the multi-level control. The control unit 401 does not display the one or more input operations corresponding to the binary control on the window 500, but displays the one or more input operations corresponding to the multi-level control as options on the window 500. More specifically, as illustrated in FIG. 5B, the control unit 401 displays "stick 1 X-axis", "stick 1 Y-axis", "stick 1 rotation", "stick 2 X-axis", "stick 2 Y-axis", and "stick 2 rotation" as the options for the one or more operations corresponding to the multi-level control on the window 500. At this time, as illustrated in FIG. 5B, the control unit 401 does not display "button 1", "button 2", "button 3", and "button 4" which are the one or more operations corresponding to the binary control on the window 500. Further, in accordance with a click operation for selecting one of the displayed options for the plurality of operations, the control unit 401 assigns the selected operation to the control item "pan". In the example of FIG. 5B, the control unit 401 assigns the operation "stick 1 X-axis" to the control item "pan". In the subsequent processing, in accordance with the operation of inclining the stick of the first stick unit 301 in the horizontal direction (the X-axis direction) by the user, it is possible to control the pan motion of the imaging apparatus 120.

The operation "button 1" is an input operation of pressing the first button in the button unit 303, which is an operation based on a binary value indicating whether the first button is pressed, and thus corresponds to the binary control. The operation "button 2" is an input operation of pressing the second button different from the first button in the button unit 303, which is an operation based on a binary value indicating whether the second button is pressed, and thus corresponds to the binary control. The operation "button 3" is an input operation of pressing the third button different from the first and second buttons in the button unit 303, which is an operation based on a binary value indicating whether the third button is pressed, and thus corresponds to the binary control. The operation "button 4" is an input operation of pressing the fourth button different from the first to third buttons in the button unit 303, which is an operation based on a binary value indicating whether the fourth button is pressed, and thus corresponds to the binary control.

A case is assumed where the GUI button 503*e* is pressed by a click operation in the state where the window 500 in FIG. 5A is displayed on the display 207 by the control unit 401. At this time, the control unit 401 references the correspondence table 600 in FIG. 6 and determines that the control item "preset 1" associated with the GUI button 503*e* is the binary control. As illustrated in FIG. 5C, the control unit 401 displays not the options for the one or more operations corresponding to the multi-level control but options for the one or more operations corresponding to the binary control on the window 500. In other words, the control unit 401 displays options for one or more operations belonging to a second group different from the first group as options that are assignable to a control item of the second type (a control item corresponding to the binary control) on the window 500. "The one or more operations belonging to the second group" indicate the one or more operations corresponding to the binary control. The window 500 illustrated in FIG. 5C is displayed on the display 207 by the control unit 401. As illustrated in FIG. 5C, the control unit 401 displays "button 1", "button 2", "button 3", and "button 4" as the options for the one or more operations corresponding to the binary control. Further, in accordance with a user operation of selecting one of the displayed options for the plurality of operations, the control unit 401 assigns the selected operation to the control item "preset 1". In the example of FIG. 5C, the control unit 401 assigns the operation "button 1" to the control item "preset 1". In the subsequent processing, in accordance with the user operation of pressing the first button in the button unit 303, it is possible to control the values of the pan, tilt, and zoom of the imaging apparatus 120 so that the imaging apparatus 120 is set at the first preset position.

Figure 6B:
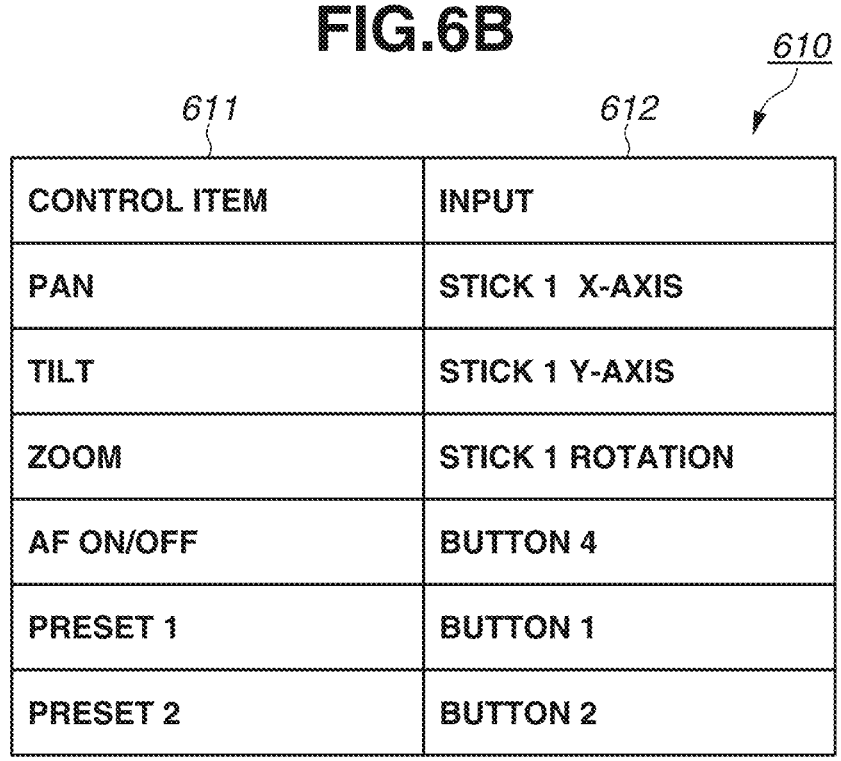

The method described above with reference to FIGS. 5B and 5C enables the user to assign an operation to the respective control items on the window 500. FIG. 5D illustrates an example of the window 500 after operations are assigned to the control items as described above. As illustrated in FIG. 5D, the operation "stick 1 X-axis" is assigned to the control item "pan", the operation "stick 1 Y-axis" is assigned to the control item "tilt", and the operation "stick 1 rotation" is assigned to the control item "zoom". Similarly, the operation "button 4" is assigned to the control item "AF on/off", the operation "button 1" is assigned to the control item "preset 1", and the operation "button 2" is assigned to the control item "preset 2". Information regarding the setting of the assignment of the operations to the control items (assignment setting information) is stored in the storage unit 402. Assignment setting information 610 in FIG. 6B is an example of the assignment setting information stored in the storage unit 402. An input 612 assigned to a control item 611 is recorded. In the example of the assignment setting information 610 in FIG. 6B, the assignment of inputs to the control items in FIG. 5D is recorded.

Figure 7A:
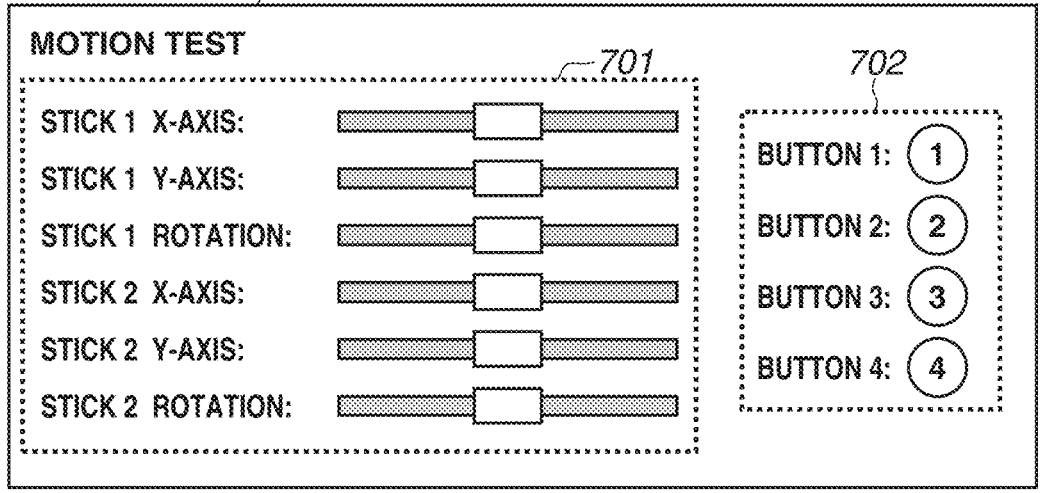
FIGS. 7A to 7C are diagrams illustrating a window for a motion test.

Next, GUIs for a motion test are described with reference to FIGS. 7A to 7C. A window 700 illustrated in FIG. 7A is GUIs for a motion test and is displayed on the display 207 by the control unit 401. The control unit 401 may display the window 500 illustrated in FIGS. 5A to 5D and the window 700 illustrated in FIGS. 7A to 7C next to each other at the same time.

As illustrated in FIG. 7A, the window 700 includes a motion test GUI 701 for the first stick unit 301 and the second stick unit 302, and a motion test GUI 702 for the button unit 303. The motion test GUI 701 includes a slider bar corresponding to each of "stick 1 X-axis", "stick 1 Y-axis", "stick 1 rotation", "stick 2 X-axis", "stick 2 Y-axis", and "stick 2 rotation". The motion test GUI 702 includes an icon corresponding to each of "button 1", "button 2", "button 3", and "button 4".

A case is assumed where the operation of inclining the stick of the first stick unit 301 of the input apparatus 110 in the horizontal direction (the X-axis direction) is performed by the user. At this time, the system control unit 421 of the input apparatus 110 transmits a control value indicating the amount of the inclination to the information processing apparatus 100 via the I/F 422. In accordance with the control value indicating the amount of inclination of the stick of the first stick unit 301 in the horizontal direction (the X-axis direction), the system control unit 401 of the information processing apparatus 100 executes the following process. The system control unit 401 changes the position of the slider on the slider bar corresponding to "stick 1 X-axis" included in the motion test GUI 701 in accordance with the control value, as illustrated in FIG. 7B. In the example of FIG. 7B, an operation of inclining the stick of the first stick unit 301 to the left in the horizontal direction (the X-axis direction) is performed, and thus, the position of the slider on the slider bar corresponding to "stick 1 X-axis" is moved from the center position to the left. If an operation of inclining the stick of the first stick unit 301 to the right in the horizontal direction (the X-axis direction) is performed, the position of the slider on the slider bar corresponding to "stick 1 X-axis" moves from the center position to the right. At this time, the amount of change in the position of the slider on the slider bar also differs in accordance with the amount of inclination of the stick. For example, the greater the amount of inclination of the stick is, the greater the amount of change in the position of the slider from the center position on the slider bar is. Thus, the position of the slider on the slider bar corresponding to "stick 1 X-axis" is changed in accordance with the operation of inclining the stick of the first stick unit 301 in the horizontal direction (the X-axis direction). This enables the user to easily grasp that "the operation of inclining the stick of the first stick unit 301 in the horizontal direction (the X-axis direction)" corresponds to a parameter "stick 1 X-axis" in the system.

While a description has been provided of the motion test in a case where the operation of inclining the stick of the first stick unit 301 in the horizontal direction (the X-axis direction) is performed, some embodiments are not limited to this. Also in a case where other operations on the first stick unit 301 or the second stick unit 302 are performed, the position of the slider on the slider bar corresponding to the operation changes. For example, if the operation of inclining the stick of the second stick unit 302 of the input apparatus 110 in the vertical direction (the Y-axis direction) is performed by the user, the control unit 401 changes the position of the slider on the slider bar corresponding to "stick 2 Y-axis" in accordance with the amount of the inclination.

A case is assumed where the first button in the button unit 303 of the input apparatus 110 is pressed by the user. At this time, the system control unit 421 of the input apparatus 110 transmits a control value indicating the pressing of the first button to the information processing apparatus 100 via the I/F 422. In response to the acquisition of the control value, the system control unit 401 of the information processing apparatus 100 executes the following process. The system control unit 401 changes the display form of the icon corresponding to "button 1" included in the motion test GUI 702, as illustrated in FIG. 7C. As described above, in accordance with the operation of pressing the first button in the button unit 303 of the input apparatus 110, the display form of the icon corresponding to "button 1" is changed. This enables the user to easily grasp that "the operation of pressing the first button" corresponds to a parameter "button 1" in the system.

If the user performs a predetermined operation on an operation unit included in the input apparatus 110, the user may be unable to easily grasp to which parameter in the system the predetermined operation corresponds. For example, in a case where the input apparatus 110 includes four buttons, it may be difficult for the user to grasp to which of "button 1", "button 2", "button 3", and "button 4" an operation on each button corresponds. As described above, based on the GUIs on the window 700 illustrated in FIGS. 7A to 7C, the display form of a GUI for an input (e.g., "button 1") corresponding to the certain button changes, in response to, for example, the pressing of a certain button (e.g., the first button) of the input apparatus 110. Thus, the user can easily grasp to which parameter in the system an operation on the input apparatus 110 corresponds. In the example of FIGS. 7A to 7C, the user can grasp that the operation on the first button of the input apparatus 110 corresponds to "button 1".

In a case where the user wishes to assign the first button to the control item "AF on/off", "preset 1", or "preset 2" through the window 500 illustrated in FIGS. 5A to 5D, the user can grasp that the user should select the operation "button 1".

Figure 7B:
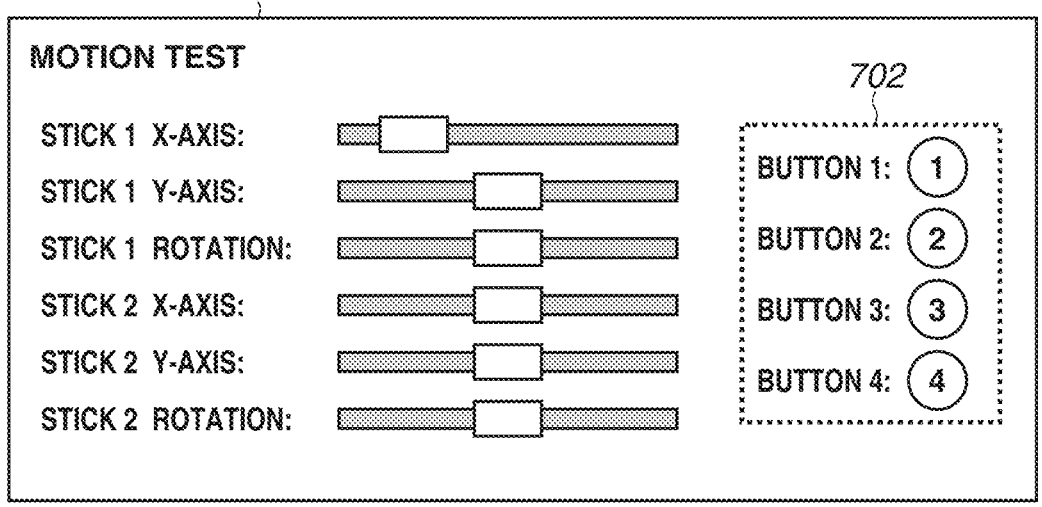
Figure 7C:
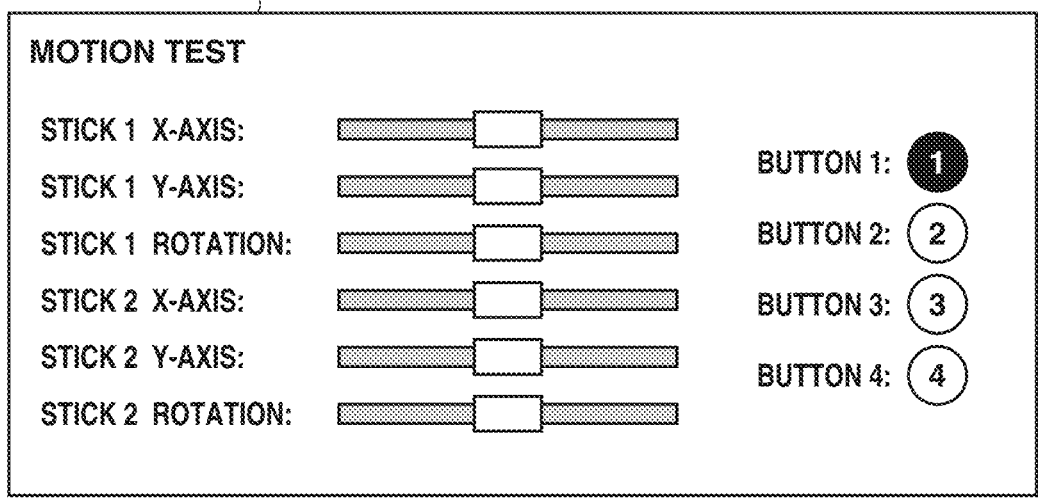
Figure 8A:
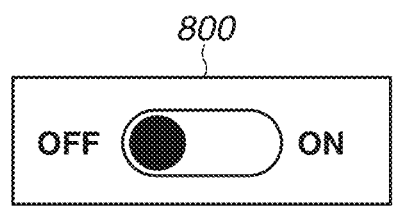
FIGS. 8A and 8B are diagrams illustrating a graphical user interface (GUI) for selecting whether to enable or disable control of the imaging apparatus.
Figure 8B:
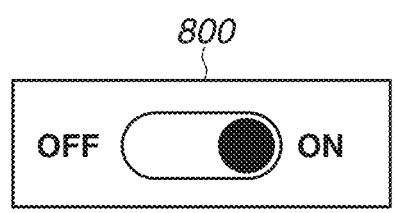

Next, a description is provided of the selection of the enabling and the disabling of the control of the imaging apparatus 120, with reference to FIGS. 8A and 8B. A GUI button 800 illustrated in FIG. 8A is a GUI displayed on the display 207 by the control unit 401 and is used for selecting whether to enable or disable the control of the imaging apparatus 120. In the state where the window 500 illustrated in FIGS. 5A to 5D and the window 700 illustrated in FIGS. 7A to 7C are displayed on the display 207 at the same time, the control unit 401 can also display the GUI button 800 on the display 207.

In the example illustrated in FIG. 8A, "off" is selected for the control of the imaging apparatus 120, and the control of the imaging apparatus 120 is disabled. If inputs corresponding to the control items are assigned as illustrated in FIG. 5D, and for example, even if the control unit 401 receives the operation "stick 1 X-axis" from the input apparatus 110, the control unit 401 does not transmit a control command to control the pan motion to the imaging apparatus 120. At this time, however, as illustrated in the window 700 in FIG. 7B, the control unit 401 changes the position of the slider corresponding to "stick 1 X-axis". As described above, if "disabled" is selected for the control of the imaging apparatus 120, the control unit 401 does not transmit a control command to the imaging apparatus 120 in accordance with an input from the input apparatus 110, but changes the display form in accordance with the input on the window 700. In this manner, it is possible to avoid inadvertently controlling the imaging apparatus 120 while the user is performing the motion test.

In FIG. 8B, "on" is selected for the control of the imaging apparatus 120, and the control of the imaging apparatus 120 is enabled. Here, if inputs corresponding to the control items are assigned as illustrated in FIG. 5D, for example, the control unit 401 transmits a control command to control the pan motion to the imaging apparatus 120 in response to the operation "stick 1 X-axis". Further, as illustrated in the window 700 in FIG. 7B, the control unit 401 changes the position of the slider corresponding to "stick 1 X-axis" at this time.

As described above, if "enabled" is selected for the control of the imaging apparatus 120, the control unit 401 transmits a control command to the imaging apparatus 120 in accordance with an input from the input apparatus 110. The control unit 401 further changes the display form in accordance with the input in the motion test on the window 700. If the user wishes to test the control of the imaging apparatus 120 with the motion test, then as illustrated in FIG. 8B, the user may select "on" in the GUI button 800.

Figure 9:
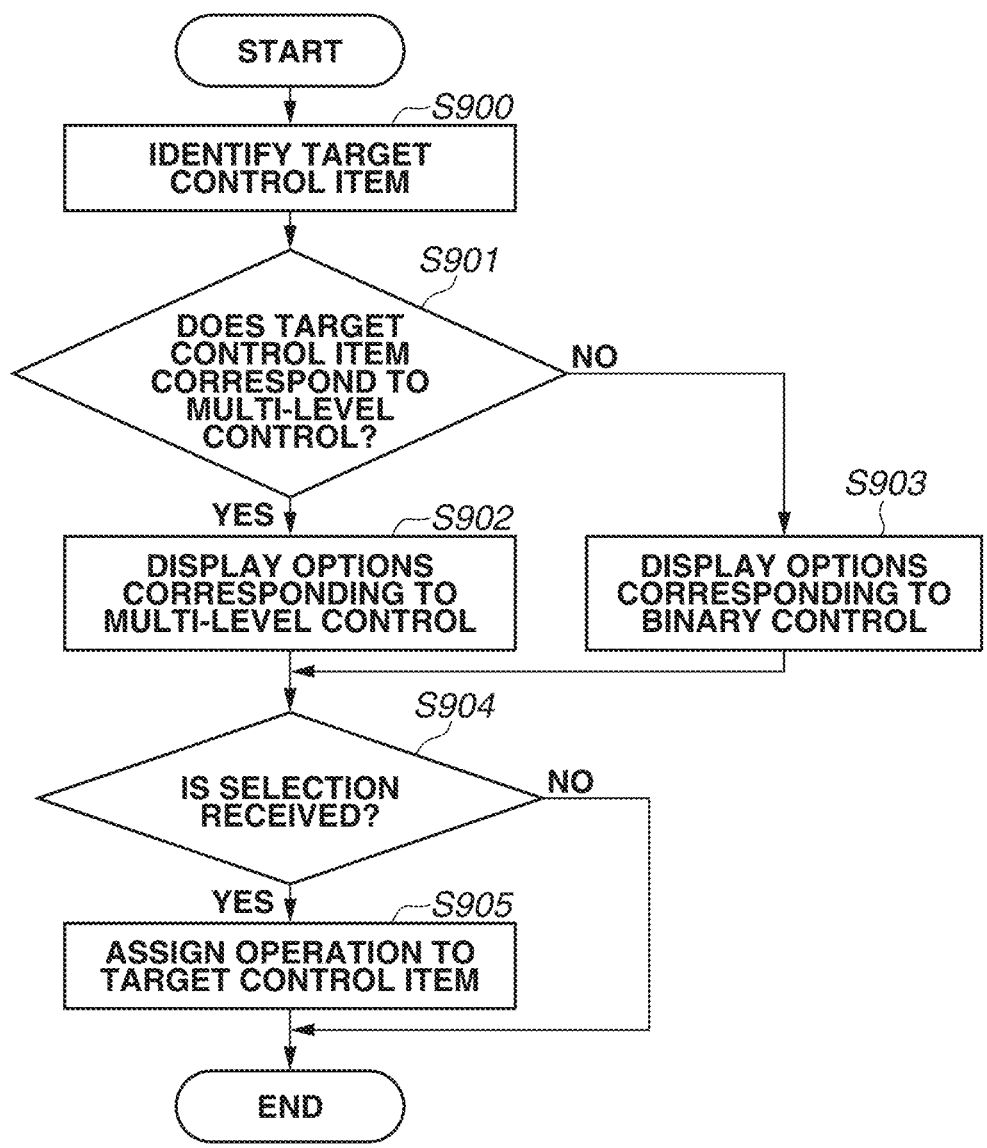
FIG. 9 is a flowchart illustrating processing of setting of assignment of an operation to a control item.

Next, a description is provided of the process of assigning an operation to a control item by the information processing apparatus 100 according to the present exemplary embodiment with reference to the flowchart illustrated in FIG. 9. The processing in the flowchart illustrated in FIG. 9 is implemented by the CPU 203 of the information processing apparatus 100 executing computer-executable instructions stored in the ROM 205 of the information processing apparatus 100. The processing in the flowchart illustrated in FIG. 9 is started in accordance with the click of any of the GUI buttons 503a to 503f in FIG. 5A by the user.

Initially in step S900, the system control unit 401 identifies a control item as an input assignment target. More specifically, if a single GUI button is selected from among the GUI buttons 503a to 503f illustrated in FIGS. 5A to 5D, the system control unit 401 identifies the control item corresponding to the selected GUI button as a control item as an operation assignment target. For example, if the GUI button 503a is selected by a click operation of the user, the system control unit 401 identifies the control item "pan" corresponding to the GUI button 503a as a current target control item.

Next, in step S901, the system control unit 401 determines whether the current target control item corresponds to the multi-level control or the binary control. If the system control unit 401 determines that the current target control item corresponds to the multi-level control (YES in step S901), the processing proceeds to step S902. If the system control unit 401 determines that the current target control item corresponds to the binary control (NO in step S901), the processing proceeds to step S903. In step S901, the system control unit 401 executes, for example, the following process to determine whether the current target control item corresponds to the multi-level control or the binary control. The system control unit 401 references the correspondence table 600 held in the storage unit 402 and identifies the control type 602 corresponding to the current target control item. For example, if the current target control item is the control item "pan", the system control unit 401 references the correspondence table 600 and determines that the control item "pan" corresponds to the multi-level control.

In step S902, as illustrated in FIG. 5B, the system control unit 401 displays not the one or more inputs corresponding to the binary control but the options for the one or more operations corresponding to the multi-level control on the display 207. In contrast, in step S903, the system control unit 401 displays not the options for the one or more operations corresponding to the multi-level control but the options for the one or more operations corresponding to the binary control on the display 207, as illustrated in FIG. 5C.

In step S904, the system control unit 401 determines whether a user operation of selecting one of the displayed options is received. If the system control unit 401 determines that the user operation is received within a certain time (YES in step S904), the processing proceeds to step S905. In step S905, the system control unit 401 assigns the selected operation to the current target control item. For example, if the current target control item is the control item "pan" and the selected operation is "stick 1 X-axis", the system control unit 401 executes the following process. The system control unit 401 assigns the operation "stick 1 X-axis" to the control item "pan" and stores information regarding the assignment in the assignment setting information held in the storage unit 402. If the system control unit 401 determines in step S904 that the user operation is not received within the certain time (NO in step S904), the system control unit 401 ends the processing of the flowchart illustrated in FIG. 9.

As described above, performing the processing of the flowchart illustrated in FIG. 9 enables presenting options suitable for the control item when options for operations that are assignable to a control item to which the user currently wishes to assign an operation are presented to the user. More specifically, operations suitable for the multi-level control are presented as options for a control item of the multi-level control, and further, operations suitable for the binary control are presented as options for a control item of the binary control. In this manner, it is possible to prevent the user's erroneous selection, for example, selecting of a binary operation, such as "button 1", for a control item for which a multi-level operation, such as the control item "pan" or the control item "tilt" that is the multi-level control, is suitable.

Although an example has been described where the input apparatus 110 according to the present exemplary embodiment includes the first stick unit 301, the second stick unit 302, and the button unit 303, the input apparatus 110 may include an operation unit of another shape as a component. For example, the input apparatus 110 may include a wheel-shaped operation unit or a knob-shaped operation unit. In such a case, it is also possible to present options that are assignable to a control item to the user in accordance with the characteristics of the operation unit.

While only the options for the operations corresponding to the multi-level control are assignable to a control item of the multi-level control and only the options for the operations corresponding to the binary control are assignable to a control item of the binary control in the present exemplary embodiment, this is not restrictive. For example, in the case of the configuration of the input apparatus 110 in which the number of the types of control items of the multi-level control is greater than the number of options for inputs of the multi-level control, and the number of options is insufficient, the operations corresponding to the binary control may be assigned to a control item of the multi-level control as the second best measure. In this case, the system control unit 401 may display information regarding a warning indicating inappropriate assignment on the display 207, thus causing the user to recognize the inappropriate assignment.

Figure 10:
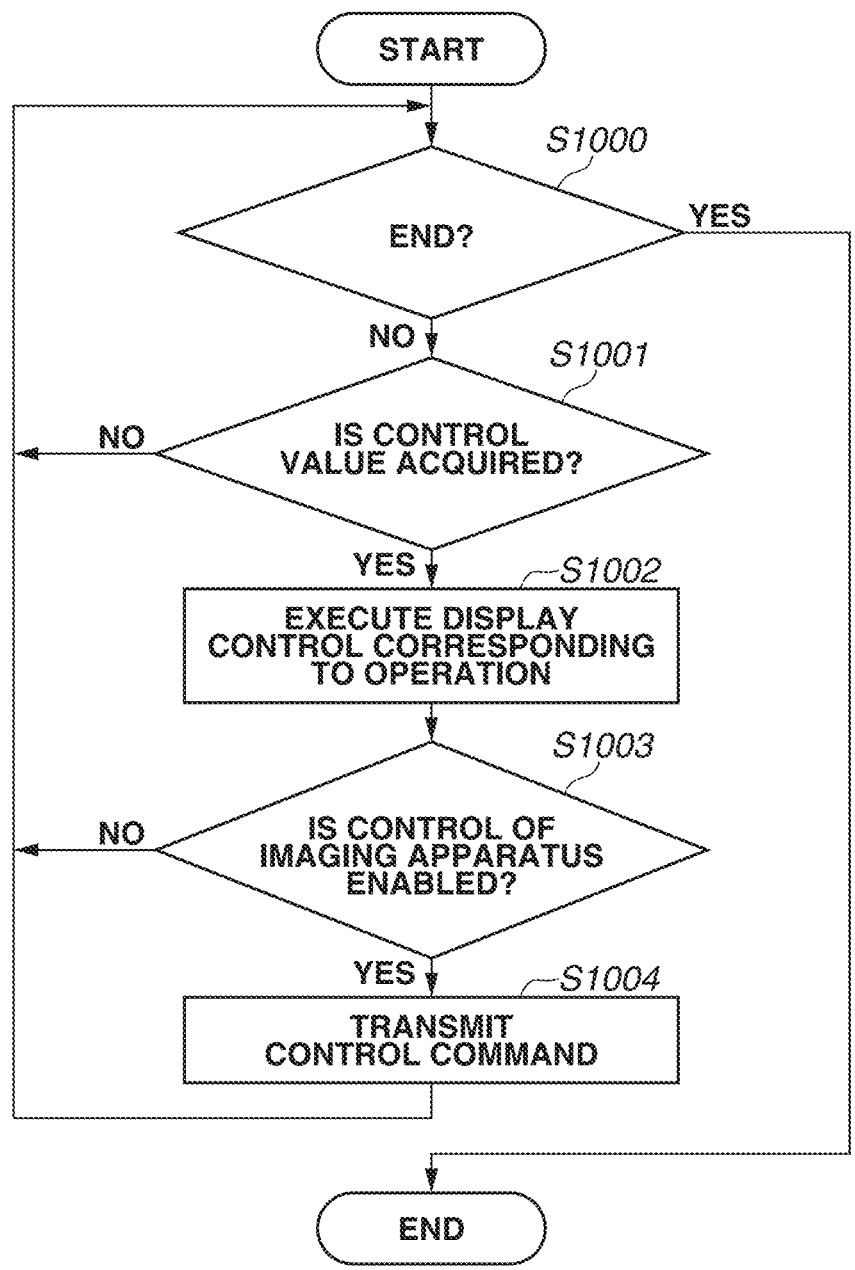
FIG. 10 is a flowchart illustrating processing of the control of the imaging apparatus.

A description will now be provided of control of the information processing apparatus 100 in accordance with an input from the input apparatus 110 with reference to a flow in FIG. 10. The processing of the flowchart illustrated in FIG. 10 is implemented by the CPU 203 of the information processing apparatus 100 executing computer-executable instructions stored in the ROM 205 of the information processing apparatus 100. For example, the processing of the flowchart illustrated in FIG. 10 is started in response to an instruction from the user or the display of the window 700 for the motion test illustrated in FIGS. 7A to 7C.

Initially, in step S1000, the system control unit 401 determines whether to end the processing of the flowchart illustrated in FIG. 10. For example, if the user gives an instruction to end the processing of the flowchart in FIG. 10, the system control unit 401 determines that the processing of the flowchart in FIG. 10 is to be ended (YES in step S1000), and ends the processing of the flowchart in FIG. 10. If the instruction to end the flowchart in FIG. 10 is not given, the system control unit 401 determines that the processing of the flowchart in FIG. 10 is not to be ended (NO in step S1000), and the processing proceeds to step S1001. In step S1001, the system control unit 401 determines whether a control value in accordance with an operation on the first stick unit 301, the second stick unit 302, or the button unit 303 is acquired from the input apparatus 110. If the system control unit 401 determines that the control value is acquired (YES in step S1001), the processing proceeds to step S1002. If the system control unit 401 determines that the control value is not acquired (NO in step S1001), the processing returns to step S1000. Then, the operation in step S1000 is repeated. In step S1002, the system control unit 401 executes display control corresponding to the acquired control value on the window 700 for the motion test.

For example, if the acquired control value is generated based on the operation "stick 1 X-axis", the system control unit 401 changes the position of the slider on the slider bar corresponding to "stick 1 X-axis" as illustrated in FIG. 7B in accordance with the control value. For example, if the acquired control value is generated based on the operation "button 1", the system control unit 401 changes the display form of the icon corresponding to "button 1" as illustrated in FIG. 7C in accordance with the control value.

Next, in step S1003, the system control unit 401 determines whether the control of the imaging apparatus 120 is currently enabled. If the system control unit 401 determines that the control of the imaging apparatus 120 is enabled (YES in step S1003), the processing proceeds to step S1004. If the system control unit 401 determines that the control of the imaging apparatus 120 is disabled (NO in step S1003), the processing returns to step S1000. The operation in step S1000 is then repeated. In step S1003, the system control unit 401 executes the following process to determine whether the control of the imaging apparatus 120 is currently enabled or disabled. The system control unit 401 identifies whether "on" is selected or "off" is selected by a user operation on the GUI button 800 in FIGS. 8A and 8B. If "on" is selected, the control unit 401 determines that the control of the imaging apparatus 120 is enabled. If "off" is selected, the control unit 401 determines that the control of the imaging apparatus 120 is disabled.

In step S1004, the system control unit 401 generates a control command in accordance with the currently acquired control value and transmits the control command to the imaging apparatus 120. For example, if the currently acquired control value is generated based on the operation "stick 1 X-axis", the system control unit 401 references the assignment setting information 610 stored in the storage unit 402 and identifies the control item "pan" corresponding to "stick 1 X-axis". The system control unit 401 generates a control command regarding the pan motion according to the control value and transmits the control command to the imaging apparatus 120. For example, the control command regarding the pan motion in accordance with the control value is a control command to specify the speed of changing the pan set in accordance with the control value. The greater the amount of inclination of the stick of the first stick unit 301 in the horizontal direction (the X-axis direction) is, the greater the value of the control value is. Then, the speed of changing the pan is also set so that the greater the value of the control value is, the greater the speed of changing the pan is. The imaging apparatus 120 having acquired the control command changes the pan in accordance with the speed of changing the pan in the control command. As another example, for example, if the currently acquired control value is generated based on the operation "button 1", the system control unit 401 references the assignment setting information 610 stored in the storage unit 402 and identifies the control item "preset 1" corresponding to "button 1". The system control unit 401 generates a control command to control the pan, tilt, and zoom position of the imaging apparatus 120 to the first preset position (values of the pan, tilt, and zoom positions) registered in advance and transmits the control command to the imaging apparatus 120. The imaging apparatus 120 having acquired the control command controls the pan, tilt, and zoom position of the imaging apparatus 120 to the first preset position (values of the pan, tilt, and zoom positions).

As described above, performing the processing of the flowchart in FIG. 10 enables the information processing apparatus 100 to perform display control of the motion test in accordance with an acquired control value and control the imaging apparatus 120. If the control of the imaging apparatus 120 is disabled, and even if the information processing apparatus 100 acquires a control value from the input apparatus 110, the information processing apparatus 100 can perform display control of the motion test, but avoid controlling the imaging apparatus 120. In this manner, in a case where the control of the imaging apparatus 120 is normally unnecessary, such as a case where the user performs the motion test, it is possible to prevent the imaging apparatus 120 from being controlled in accordance with an operation on the input apparatus 110.

A second exemplary embodiment of the present disclosure will be described below. In the first exemplary embodiment, a description has been provided of an exemplary embodiment in which, in a case where an operation is to be assigned to a control item, options for operations suitable for the control item are presented. In the second exemplary embodiment, display control of a window for a motion test is executed in accordance with specification of a control item which serves as an operation assignment target. The processing of the information processing apparatus 100 according to the present exemplary embodiment is described below with reference to FIGS. 11A to 11C and 12.

In the present exemplary embodiment, a description is provided of a method that uses UIs different from those in the first exemplary embodiment.

The differences from the first exemplary embodiment are mainly described below, and components and processes similar or equivalent to those in the first exemplary embodiment are designated by the same signs, and are not redundantly described.

A window 1100 in FIG. 11A is a GUI for a motion test similar to the window 700 illustrated in FIG. 7A, and thus is not described. If any of the GUI buttons 503a to 503f is selected by a click operation of the user in the state where the window 500 in FIGS. 5A to 5D is displayed on the display 207, the control unit 401 executes the following process. The control unit 401 changes the display form of the window 1100 for the motion test in accordance with the type (the multi-level control or the binary control) of the control item corresponding to the selected GUI button. For example, a case is assumed where the GUI button 503a is selected. Since the control item "pan" corresponding to the GUI button 503a is the multi-level control, the control unit 401 then displays highlighting 1101 for a portion corresponding to the multi-level control on the window 1100 displayed on the display 207, as illustrated in FIG. 11B. Thus, if a control item that is the multi-level control is identified as an assignment target, it is possible to present information indicating that the operations "stick 1 X-axis", "stick 1 Y-axis", "stick 1 rotation", "stick 2 X-axis", "stick 2 Y-axis", and "stick 2 rotation" corresponding to the multi-level control are suitable as options to the user. Similarly, for example, a case is assumed where the GUI button 503e is selected. Since the control item "preset 1" corresponding to the GUI button 503e is the binary control, then as illustrated in FIG. 11C, the control unit 401 displays highlighting 1102 regarding a portion corresponding to the binary control on the window 1100 displayed on the display 207. As described above, if a control item that is the binary control is identified as an assignment target, it is possible to present information indicating that the operations "button 1", "button 2", "button 3", and "button 4" are suitable as options to the user.

Figure 12:
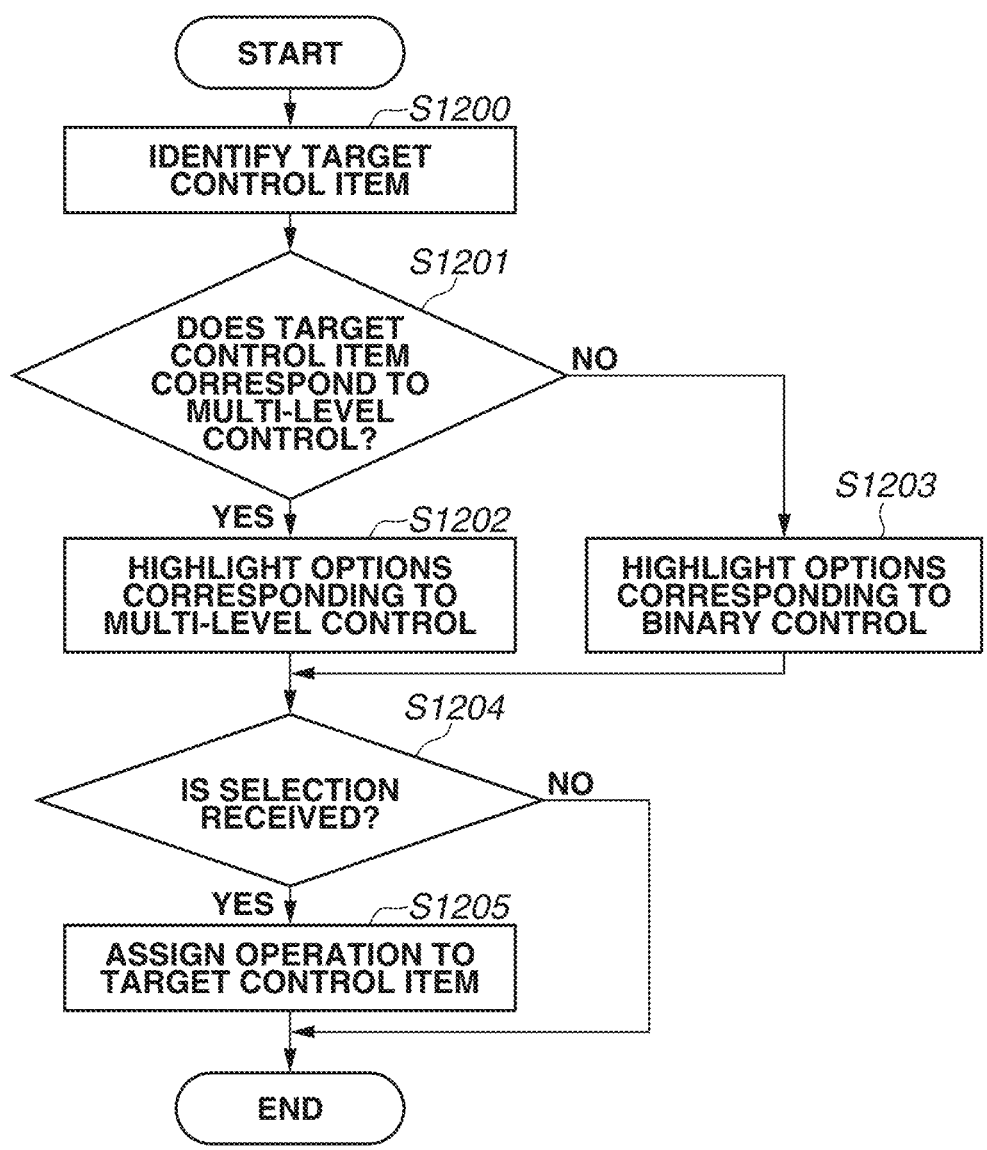
FIG. 12 is a flowchart illustrating processing of setting of assignment of an operation to a control item.

A description is now provided of information processing of the information processing apparatus 100 according to the present exemplary embodiment with reference to a flowchart in FIG. 12. The processing of the flowchart illustrated in FIG. 12 is implemented by the CPU 203 of the information processing apparatus 100 executing a computer program stored in the ROM 205 of the information processing apparatus 100. The processing of the flowchart illustrated in FIG. 12 is started in response to the click of any of the GUI buttons 503a to 503f in FIG. 5A by the user.

Initially, in step S1200, the system control unit 401 identifies a control item as an operation assignment target. More specifically, if a single GUI button is selected among the GUI buttons 503a to 503f illustrated in FIGS. 5A to 5D, the system control unit 401 identifies the control item corresponding to the selected GUI button as a control item serving as an assignment target. For example, if the GUI button 503a is selected by a click operation of the user, the system control unit 401 identifies the control item "pan" corresponding to the GUI button 503a as a current target control item.

Next, in step S1201, the system control unit 401 determines whether the current target control item corresponds to the multi-level control or corresponds to the binary control. If the system control unit 401 determines that the current target control item corresponds to the multi-level control (YES in step S1201), the processing proceeds to step S1202. If the system control unit 401 determines that the current target control item corresponds to the binary control (NO in step S1201), the processing proceeds to step S1203.

In step S1202, as illustrated in FIG. 11B, the system control unit 401 highlights the portion corresponding to the multi-level control on the window 1100 displayed on the display 207. In contrast to this, in step S1203, the system control unit 401 highlights the portion corresponding to the binary control on the window 1100 displayed on the display 207, as illustrated in FIG. 11C.

In step S1204, the system control unit 401 determines whether a user operation of selecting one of a plurality of options including the operations corresponding to the multi-level control and the operations corresponding to the binary control is received. If the system control unit 401 determines that the user operation is received within a certain time (YES in step S1204), the processing proceeds to step S1205. In step S1205, the system control unit 401 assigns the selected operation to the current target control item. For example, if the current target control item is the control item "pan" and the selected operation is "stick 1 X-axis", the system control unit 401 assigns the operation "stick 1 X-axis" to the control item "pan". If the system control unit 401 determines in step S1204 that the user operation is not received within the certain time (NO in step S1204), the processing of the flowchart illustrated in FIG. 12 is ended.

As described above, the processing of the flowchart illustrated in FIG. 12 is executed, so that it is possible to highlight options for operations suitable for assignment to a control item to which the user currently wishes to assign an operation. In this manner, for example, it is possible to prevent the user's erroneous selection, for example, selecting of a binary operation, such as "button 1", for a control item for which a multi-level operation, such as the control item "pan" or the control item "tilt" that is the multi-level control, is suitable.

A third exemplary embodiment of the present disclosure will be described below. In the third exemplary embodiment, a description is provided of an exemplary embodiment in which, in accordance with a control value based on an operation on the input apparatus 110, display control of not only a window for a motion test but also a window for assigning an operation to a control item is executed. The differences from the above exemplary embodiments are mainly described below, and components and processes similar or equivalent to those in the above exemplary embodiments are designated by the same signs, and are not redundantly described.

FIG. 13 illustrates information displayed on the display 207 by the control unit 401 according to the present exemplary embodiment. The information includes a window 1301, a window 1302, and a GUI button 1303. The window 1301 has a function similar to that of the window 500 described in conjunction with FIGS. 5A to 5D. The window 1302 has a function similar to that of the window 700 described in conjunction with FIGS. 7A to 7C. The GUI button 1303 has a function similar to that of the GUI button 800 illustrated in FIGS. 8A and 8B. In the present exemplary embodiment, the control unit 401 further executes the following process. The control unit 401 acquires a control value indicating the pressing of the first button from the input apparatus 110 in response to, for example, the pressing of the first button in the button unit 303 of the input apparatus 110 by the user. With the acquisition of the control value, the control unit 401 changes the display form of the icon of "button 1" corresponding to the first button, as illustrated in FIG. 13. The control unit 401 further changes the display form of a portion of the control item "preset 1" to which the operation "button 1" is currently assigned, as illustrated in the window 1301 in FIG. 13. At this time, the control of the imaging apparatus 120 is disabled as illustrated in the GUI button 1303, and thus, the imaging apparatus 120 is not controlled. In this manner, in response to the acquisition of a control value based on an operation on the input apparatus 110, display control in accordance with the operation is performed on the window 1302 for a motion test while display control in accordance with the operation is also executed on the window 1301 for the setting of the assignment of an operation to a control item. In this manner, a control item corresponding to an operation on the input apparatus 110 is highlighted, and thus, the user can easily check the control item corresponding to the operation.

Other Exemplary Embodiments

Some embodiments can be implemented by the process of causing one or more processors to read and execute computer-executable instructions for implementing one or more functions of the above exemplary embodiments. The computer-executable instructions may be supplied to a system or an apparatus including the one or more processors via a network or a storage medium. And some embodiments can be achieved by a circuit (e.g., an application-specific integrated circuit (ASIC)) for achieving the one or more functions of the above exemplary embodiments.

While the present disclosure has described exemplary embodiments, the above exemplary embodiments merely illustrate specific examples for carrying out the present disclosure, and the technical scope of the present disclosure should not be interpreted in a limited manner based on these exemplary embodiments. That is, embodiments of the present disclosure can be carried out in various ways without departing from the technical ideas or the main features of the present disclosure. For example, the combinations of the exemplary embodiments are also included in the disclosed content of the specification.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-115712, which was filed on Jul. 20, 2022 and which is hereby incorporated by reference herein in its entirety.

What is claimed is:

1. An information processing apparatus comprising:
one or more memories; and
one or more processors, wherein the one or more processors and the one or more memories are configured to:
cause a display unit
to display each of a plurality of control items regarding control of an imaging apparatus using an input apparatus,
to display options for one or more operations belonging to a first group among a plurality of operations on the input apparatus as options for operations on the input apparatus that are assignable by a user operation to a control item of a first type among the plurality of control items, and
to display options for one or more operations belonging to a second group different from the first group among the plurality of operations on the input apparatus as options for operations on the input apparatus that are assignable by a user operation to a control item of a second type different from the control item of the first type among the plurality of control items; and
set assignment of operations on the input apparatus to the plurality of control items in accordance with one or more user operations.

2. The information processing apparatus according to claim 1, wherein the control item of the first type is a control item for any one of pan, tilt, and zoom of the imaging apparatus.

3. The information processing apparatus according to claim 1, wherein the control item of the second type is a control item corresponding to control for changing values of pan, tilt, and zoom so that the imaging apparatus is set at a first preset position having predetermined values of pan, tilt, and zoom.

4. The information processing apparatus according to claim 1, wherein the control item of the second type is a control item for switching between on and off states of a predetermined function of the imaging apparatus.

5. The information processing apparatus according to claim 1, wherein the input apparatus is a joystick including an operation unit configured to be inclined in at least either an X-axis direction or a Y-axis direction.

6. The information processing apparatus according to claim 1,
wherein the options for the one or more operations belonging to the first group are options for operations on an operation unit to which a multi-level input at three or more levels is inputtable, and wherein the options for the one or more operations belonging to the second group are options for operations on an operation unit to which a binary input is inputtable.

7. The information processing apparatus according to claim 1,
wherein the input apparatus includes an operation unit configured to be inclined in a predetermined direction, and
wherein the options for the one or more operations belonging to the first group include an option for an operation of inclining the operation unit in the predetermined direction.

8. The information processing apparatus according to claim 1,
wherein the input apparatus includes an operation unit configured to be inclined in a horizontal direction or a vertical direction, and
wherein the options for the one or more operations belonging to the first group include an option for an operation of inclining the operation unit in the horizontal direction and an option for an operation of inclining the operation unit in the vertical direction.

9. The information processing apparatus according to claim 1,
wherein the input apparatus at least includes a first button and a second button configured to be subjected to a pressing operation, and
wherein the options for the one or more operations belonging to the second group include an option for an operation on the first button and an option for an operation on the second button.

10. The information processing apparatus according to claim 1, wherein, in accordance with an operation on the input apparatus, the one or more processors and the one or more memories are further configured to cause the display unit to display a window for a motion test in which display control corresponding to the operation is executed.

11. An information processing method comprising:
performing control to cause a display unit to display each of a plurality of control items regarding control of an imaging apparatus using an input apparatus;
performing control to cause the display unit to display options for one or more operations belonging to a first group among a plurality of operations on the input apparatus as options for operations on the input apparatus that are assignable by a user operation to a control item of a first type among the plurality of control items;
performing control to cause the display unit to display options for one or more operations belonging to a second group different from the first group among the plurality of operations on the input apparatus as options for operations on the input apparatus that are assignable by a user operation to a control item of a second type different from the control item of the first type among the plurality of control items; and
setting assignment of operations on the input apparatus to the plurality of control items in accordance with a user operation.

12. A non-transitory computer-readable storage medium storing computer-executable instructions that, when executed by a computer, cause the computer to:
perform control to cause a display unit to display each of a plurality of control items regarding control of an imaging apparatus using an input apparatus;
perform control to cause the display unit to display options for one or more operations belonging to a first group among a plurality of operations on the input apparatus as options for operations on the input apparatus that are assignable by a user operation to a control item of a first type among the plurality of control items;
perform control to cause the display unit to display options for one or more operations belonging to a second group different from the first group among the plurality of operations on the input apparatus as options for operations on the input apparatus that are assignable by a user operation to a control item of a second type different from the control item of the first type among the plurality of control items; and
set assignment of operations on the input apparatus to the plurality of control items in accordance with a user operation.

* * * * *